(12) United States Patent
Jannelli et al.

(10) Patent No.: US 8,826,373 B2
(45) Date of Patent: Sep. 2, 2014

(54) METHODS AND SYSTEMS FOR SHARING DIGITAL ASSETS

(75) Inventors: Vince Jannelli, Mahwah, NJ (US); Boguslaw Ludwik Plewnia, Mission Viejo, CA (US); Roger Shih, Tustin, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/549,447

(22) Filed: Jul. 14, 2012

(65) Prior Publication Data
US 2014/0020071 A1    Jan. 16, 2014

(51) Int. Cl.
*H04L 9/32* (2006.01)

(52) U.S. Cl.
USPC .................. 726/2; 726/3; 726/4; 726/5

(58) Field of Classification Search
CPC ..... H04L 63/08; H04L 63/0861; H04L 63/10; H04L 63/101; G06F 21/30; G06F 21/31; G06F 21/32
USPC .............. 726/1–7, 26–29; 713/163, 165, 167, 713/168, 193; 705/51–53; 709/217, 219
See application file for complete search history.

(56) References Cited

U.S. PATENT DOCUMENTS

| | | | |
|---|---|---|---|
| 5,644,711 A | 7/1997 | Murphy | |
| 7,333,943 B1 | 2/2008 | Charuk et al. | |
| 7,730,089 B2 | 6/2010 | Campbell et al. | |
| 7,770,204 B2 | 8/2010 | Pathakis et al. | |
| 7,848,966 B2 | 12/2010 | Charuk et al. | |
| 7,908,384 B2 | 3/2011 | Tada | |
| 8,245,141 B1 * | 8/2012 | Fuller et al. | 715/741 |
| 8,464,314 B2 * | 6/2013 | Lim | 726/1 |
| 2011/0231280 A1 * | 9/2011 | Farah | 705/26.8 |

* cited by examiner

*Primary Examiner* — Hosuk Song
(74) *Attorney, Agent, or Firm* — Kristine Elizabeth Matthews; David C. Ripma

(57) ABSTRACT

Aspects of the present invention relate to systems and methods for providing non-subscriber access to a digital asset and, in particular, to methods and systems for providing non-subscriber access to a digital asset while providing provider protection. A temporary guest credential may be generated that may allow access to a limited workspace on a resource server. The temporary guest credentials may expire after a guest-account duration limit.

25 Claims, 6 Drawing Sheets

METHODS AND SYSTEMS FOR SHARING DIGITAL ASSETS

FIELD OF THE INVENTION

Embodiments of the present invention relate generally to methods and systems for providing non-subscriber access to a digital asset and, in particular, to methods and systems for providing non-subscriber access to a digital asset while providing provider protection.

BACKGROUND

With the proliferation of online storage services, also referred to as Software as a Service (SaaS), it may be very convenient for a subscriber, also referred to as an SaaS user, to access a digital asset, which may be stored within an SaaS application, from multiple devices, for example, a smart phone, a personal computer and other mobile or static computing devices. However, with the subscription model, it may be difficult for a non-subscriber to share a digital asset with the subscriber without sharing the subscriber's credentials, either directly or indirectly. For example, if an application is browser accessible, a subscriber may have to log in to a non-subscriber's computing device and then allow the non-subscriber to upload a digital asset, giving the non-subscriber the same privileges as the subscriber, which may be more privileges than necessary for the task, which can potentially be used for malicious purposes. Methods and systems that allow access to a digital asset while preventing the sharing of subscriber credentials, for an SaaS application, with a non-subscriber may be desirable.

SUMMARY

Some embodiments of the present invention relate generally to methods and systems for providing non-subscriber access to a digital asset and, in particular, to methods and systems for providing non-subscriber access to a digital asset while providing provider protection.

According to a first aspect of the present invention, a resource server may be communicatively coupled with one, or more, mobile and/or static client computing devices, wherein exemplary client computing devices may include a smart phone, a laptop computer, a personal desktop computer, a printing device, a scanner, an imaging device, a digital interactive white-board and a multi-function peripheral.

According to a second aspect of the present invention, a request for creation of a guest account may be received at a resource server from a client computing device associated with a subscriber. A request for a workspace identifier may be sent from the resource server. A workspace identifier may be received at the resource server. A request for a guest-account duration limit may be sent from the resource server. A guest-account duration limit may be received at the resource server. The resource server may assign a guest workspace based on the workspace identifier, may generate guest credentials, may associate the guest credentials with the guest workspace and may transmit the guest credentials.

According to a third aspect of the present invention, a request for creation of a guest account may be received at a resource server from a client computing device associated with a subscriber. The request for creation of a guest account may comprise a workspace identifier and/or a guest-account duration limit.

According to a fourth aspect of the present invention, a non-subscriber may access a guest workspace on a resource server using temporary guest credentials generated at the resource server in response to a request for creation of a guest account from a client computing device associated with a subscriber.

According to a fifth aspect of the present invention, a client computing device using guest credentials may upload files from the client computing device to a resource server.

According to a sixth aspect of the present invention, a client computing device using guest credentials may download files from a resource server to the client computing device.

According to a seventh aspect of the present invention, a client computing device may be a multi-function peripheral, or other printing device, and may access, using guest credentials, files in a guest workspace, on a resource server, for printing.

According to an eighth aspect of the present invention, a client computing device may be a multi-function peripheral, a scanner, a digital interactive white-board or other image-acquisition device, and may scan, or otherwise acquire data, using guest credentials, directly to a guest workspace on a resource server.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a picture illustrating exemplary embodiments of the present invention comprising a resource server communicatively coupled with one, or more, mobile and/or static client computing devices, wherein exemplary client devices may include a smart phone, a laptop computer, a personal desktop computer, a printing device, a scanner, an imaging device, a digital interactive white-board and a multi-function peripheral;

FIG. 2 is a flowchart depicting exemplary embodiments of the present invention comprising receiving, associated with a subscriber, a request for creation of a guest account, sending a request for a workspace identifier, receiving a workspace identifier, sending a request for a guest-account duration limit, receiving a guest-account duration limit, assigning a guest workspace, generating guest credentials, associating the guest credentials with the guest workspace and transmitting the guest credentials;

DETAILED DESCRIPTION OF EXEMPLARY EMBODIMENTS

Figure 1:
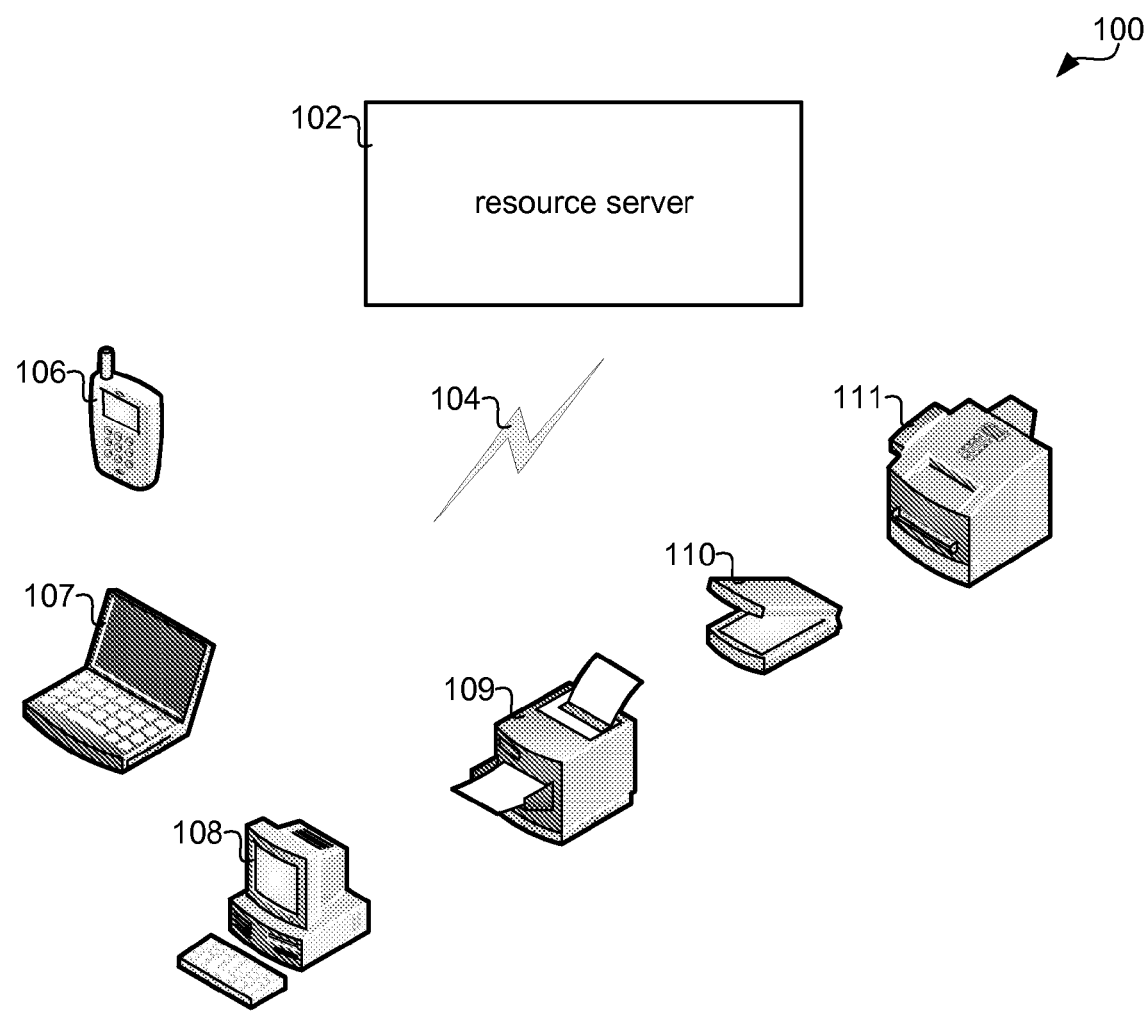

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

With the proliferation of online storage services, also referred to as Software as a Service (SaaS), it may be very convenient for a subscriber, also referred to as an SaaS user, to access a digital asset, which may be stored within an SaaS application, from multiple devices, for example, a smart phone, a personal computer and other mobile or static computing devices. However, with the subscription model, it may be difficult for a non-subscriber to share a digital asset with the subscriber without sharing the subscriber's credentials, either directly or indirectly. For example, if an application is browser accessible, a subscriber may have to log in to a non-subscriber's computing device and then allow the non-subscriber to upload a digital asset, giving the non-subscriber the same privileges as the subscriber, which may be more privileges than necessary for the task, which can potentially be used for malicious purposes. Methods and systems that allow access to a digital asset while preventing the sharing of subscriber credentials, for an SaaS application, with a non-subscriber may be desirable.

Some exemplary embodiments of the present invention may be described in relation to FIG. 1. A computing system 100 may comprise a resource server 102, for example, a cloud server or other server that allots resources, communicatively coupled via a communication connection 104 to one, or more, mobile and/or static client devices, six shown 106-111. Exemplary client devices may include a smart phone 106, a laptop computer 107, a personal desktop computer 108, a printing device 109, a scanner 110, a multi-function peripheral 111, an imaging device (not shown), a digital interactive white-board (not shown) and other computing devices (not shown). A first user, also considered a subscribing user, may subscribe to a resource associated with the resource server 102 and may wish to provide a second user, who does not subscribe to the resource, also considered a non-subscribing user, access to the resource server 102. The subscribing user may wish to provide the non-subscribing user access to the resource server in order that the non-subscribing user may perform a sharing action related to a digital asset. For example, the non-subscribing user may upload files to the resource server 102 from a computing device, for example, one of devices 106-111; the non-subscribing user may download files to a computing device, for example, one of devices 106-111, from the resource server 102; the non-subscribing user may access a file on the resource server 102 for printing on a multi-function peripheral 111 or printer 109; the non-subscribing user may upload a scanned image directly from a network enabled scanner 110, or network enabled multi-function peripheral 111, to the resource server 102; and the non-subscribing user may perform other functions related to a digital asset shared between the resource server 102 and a client computing device 106-111.

Figure 2:
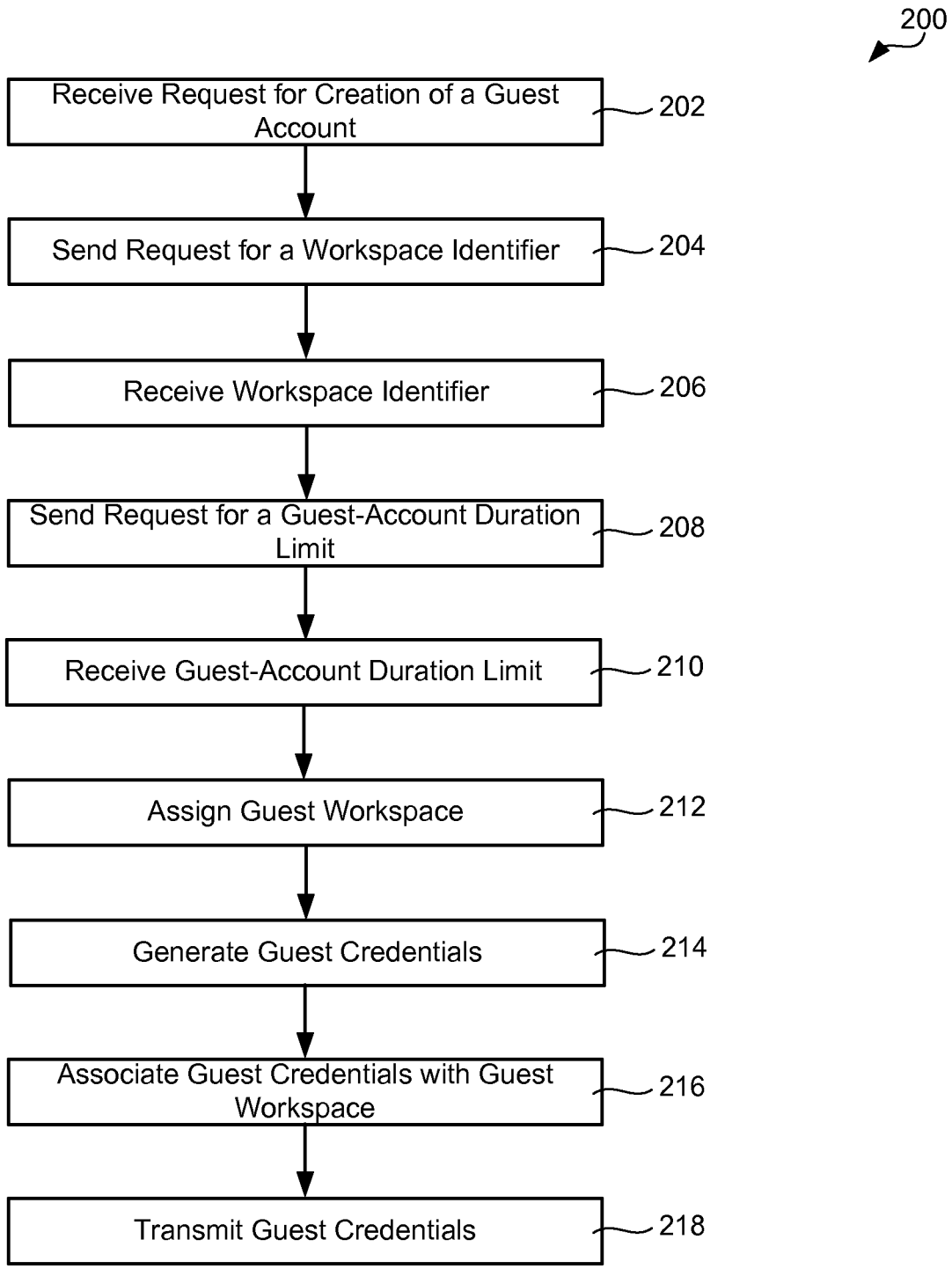

Some embodiments of the present invention may comprise a method 200 for sharing a digital asset and may be understood in relation to a flowchart shown in FIG. 2. Some embodiments of the present invention may comprise a non-transitory computer-readable medium encoded with a computer program code for implementing the method 200 shown in FIG. 2.

A request, associated with a subscriber, may be received 202, from a requesting client device, at a resource server, for example, a cloud server or other server that allots resources, for creation of a guest account. The resource server may send a request 204, to the requesting client device, for a workspace identifier. The workspace identifier may be the name of a file, directory or other identifier of a workspace to which the subscriber wishes to allow guest access. The workspace may be referred to as a guest workspace. A workspace identifier may be received 206 at the resource server.

The resource server may send a request 208, to the requesting client device, for a guest-account duration limit. The guest-account duration limit may be a period of time for which guest credentials, also considered a guest credential, may be valid and for which the guest account may be accessed using the guest credentials. The guest-account duration limit may be indicated, for example, as an absolute date, a relative date, an interval of time, a number of accesses to the resource server, or any other duration indicator. The guest-account duration limit may be received 210 at the resource server.

The resource server may assign 212 a guest workspace associated with the workspace identifier. The guest workspace may be created if it is a new workspace. The resource server may generate 214 guest credentials. The guest credentials may be associated 216 with the guest workspace. Guest credentials may comprise a user name and password. In some embodiments of the present invention, the guest-account duration limit may be embedded in the guest credentials. The resource server may transmit 218 the guest credentials to the requesting client device. In some embodiments, the guest credentials may be emailed to an email account associated with the subscriber. In some embodiments of the present invention, user instructions, or other information, for example, a Universal Resource Locator (URL) associated with the resource server, may be transmitted with the guest credentials. During the period of time in which the guest credentials are valid, a non-subscriber may use the guest credentials to access the guest workspace. The non-subscriber may not access other portions of the subscriber's workspace, or resource server, thereby a limited set of features and functionality is exposed to the non-subscriber.

Figure 3A:
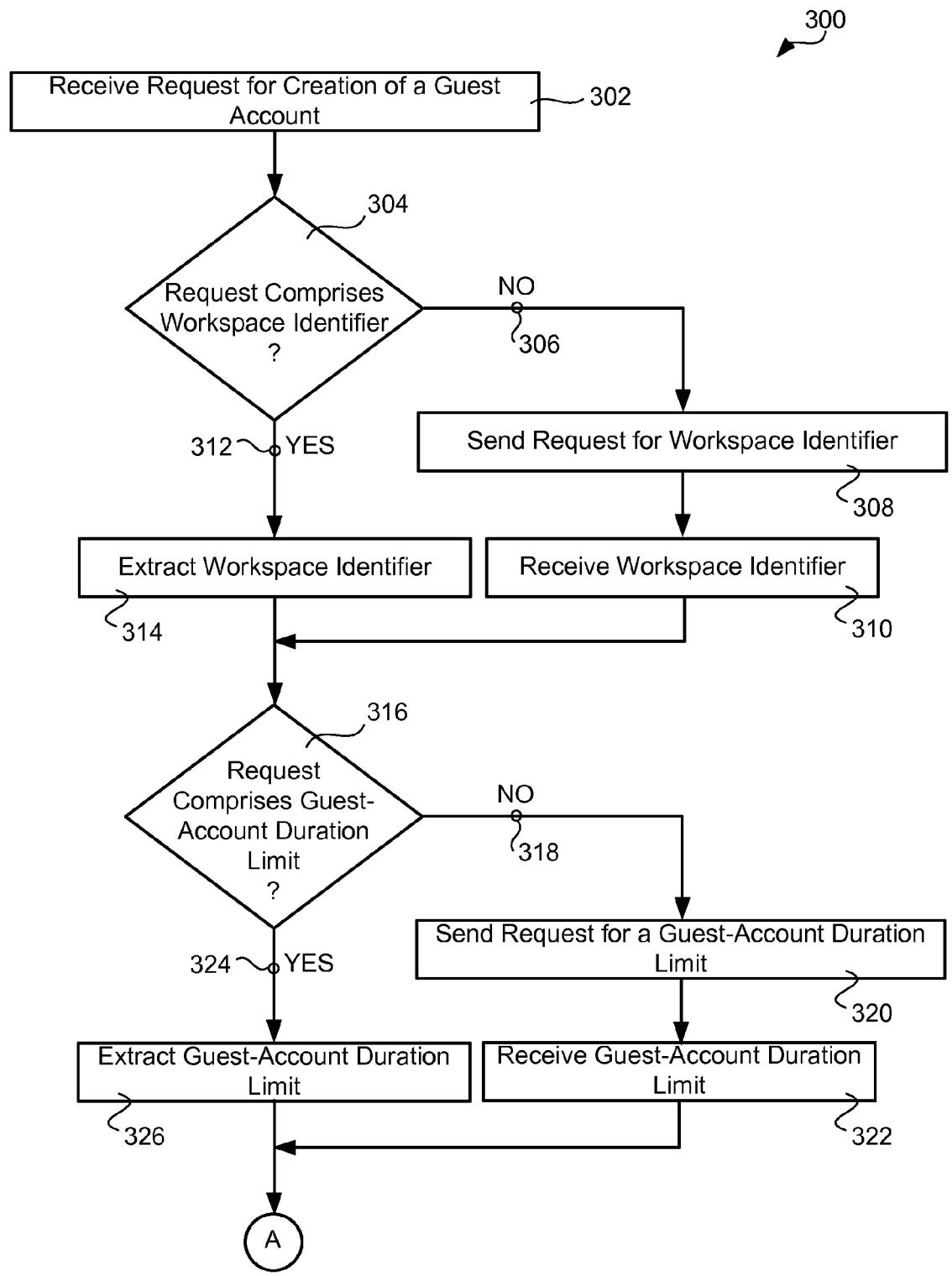
FIG. 3 is a flowchart depicting exemplary embodiments of the present invention comprising receiving, associated with a subscriber, a request for creation of a guest account, assigning a guest workspace, generating guest credentials, associating the guest credentials with the guest workspace and transmitting the guest credentials.
Figure 3B:
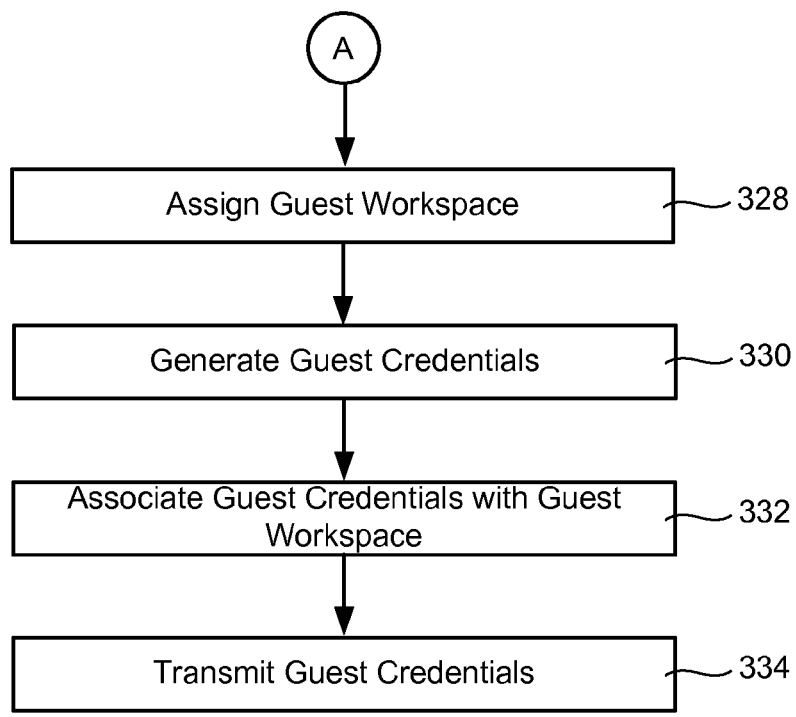

Alternative embodiments of the present invention comprising a method 300 for sharing a digital asset may be described in relation to a flowchart shown in FIG. 3. Some embodiments of the present invention may comprise a non-transitory computer-readable medium encoded with a computer program code for implementing the method 300 shown in FIG. 3.

A request, associated with a subscriber, may be received 302, from a requesting client device, at a resource server, for example, a cloud server or other server that allots resources, for creation of a guest account. A determination of whether, or not, the request comprises a workspace identifier may be made 304. If the request does not 306 comprise a workspace identifier, the resource server may send a request 308, to the requesting client device, for a workspace identifier. The workspace identifier may be the name of a file, directory or other identifier of a workspace to which the subscriber wishes to allow guest access. The workspace may be referred to as a guest workspace. A workspace identifier may be received 310 at the resource server. If the request for a guest account does comprise 312 a workspace identifier, the workspace identifier may be extracted 314 from the request.

A determination of whether, or not, the request comprises a guest-account duration limit may be made 316. If the request does not 318 comprise a guest-account duration limit, the resource server may send a request 320 for a guest-account duration limit. The guest-account duration limit may be a period of time for which guest credentials, also considered a guest credential, may be valid and the guest account may be accessed using the guest credentials. The guest-account duration limit may be indicated, for example, as an absolute date, a relative date, an interval of time, a number of accesses to the resource server, or any other duration indicator. The guest-account duration limit may be received 322 at the resource server. If the request for a guest account does comprise 324 a duration limit, the duration limit may be extracted 326 from the request.

The resource server may assign 328 a guest workspace associated with the workspace identifier. The guest workspace may be created if it is a new workspace. The resource server may generate 330 guest credentials. The guest credentials may be associated 332 with the guest workspace. Guest credentials may comprise a user name and password. In some embodiments of the present invention, the guest-account duration limit may be embedded in the guest credentials. The resource server may transmit 334 the guest credentials to the requesting client computing device. In some embodiments, the guest credentials may be emailed to an email account associated with the subscriber. In some embodiments of the present invention, user instructions, or other information, for example, a Universal Resource Locator (URL) associated with the resource server, may be transmitted with the guest credentials. During the period of time in which the guest credentials are valid, a non-subscriber may use the guest credentials to access the guest workspace. The non-subscriber may not access other portions of the subscriber's workspace, thereby a limited set of features and functionality is exposed to the non-subscriber.

Figure 4:
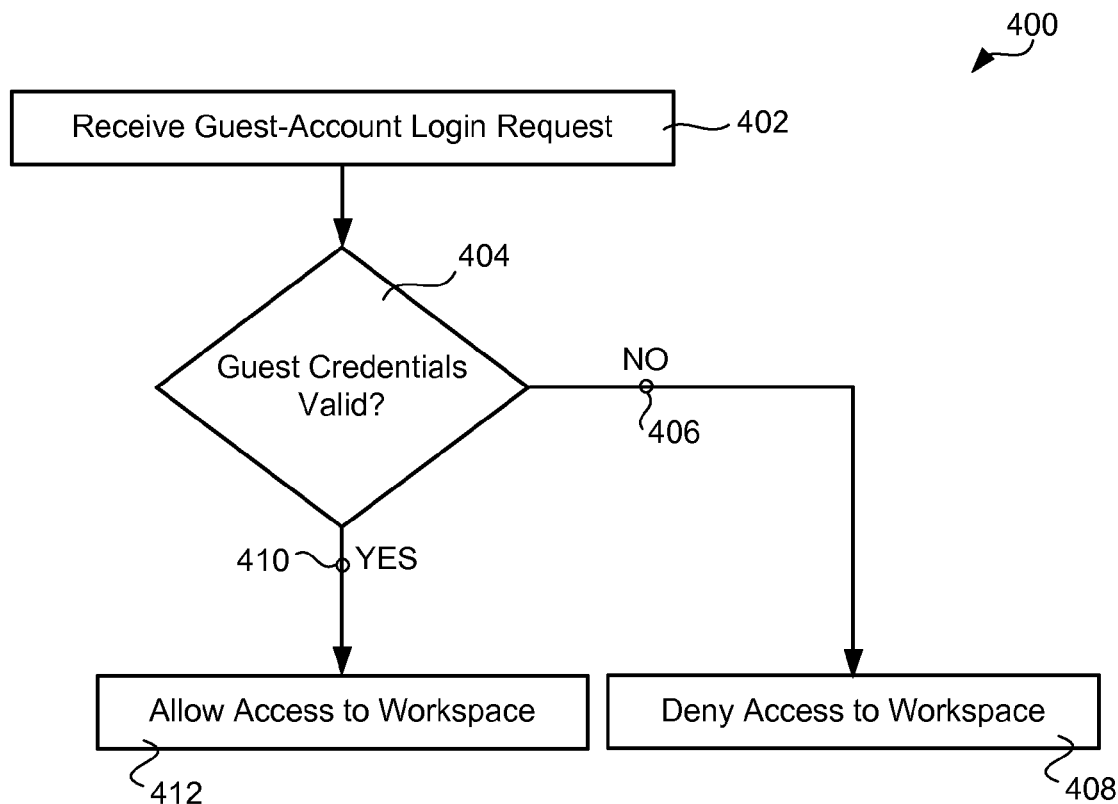
FIG. 4 is a flowchart depicting exemplary embodiments of the present invention comprising receiving a guest-account login request, validating a guest credential and allowing or denying workspace access based on the results of the guest-credential validation.

Some embodiments of the present invention may comprise a method 400 for sharing a digital assets and may be understood in relation to a flowchart shown in FIG. 4. Some embodiments of the present invention may comprise a non-transitory computer-readable medium encoded with a computer program code for implementing the method 400 shown in FIG. 4.

A request may be received 402, at a resource server, for example, a cloud server or other server that allots resources, for a guest account login. The request may comprise guest credentials. A determination of whether, or not, the guest credentials are valid may be made 404. Guest credentials may be deemed invalid 406 if the password is incorrect, if a time duration during which the guest credentials are valid has elapsed, or if a guest workspace associated with the guest credentials has been moved or deleted. If the guest credentials are not valid 406, access to the guest workspace may be denied 408. If the guest credentials are valid 410, access to the guest workspace may be allowed 412.

Figure 5:
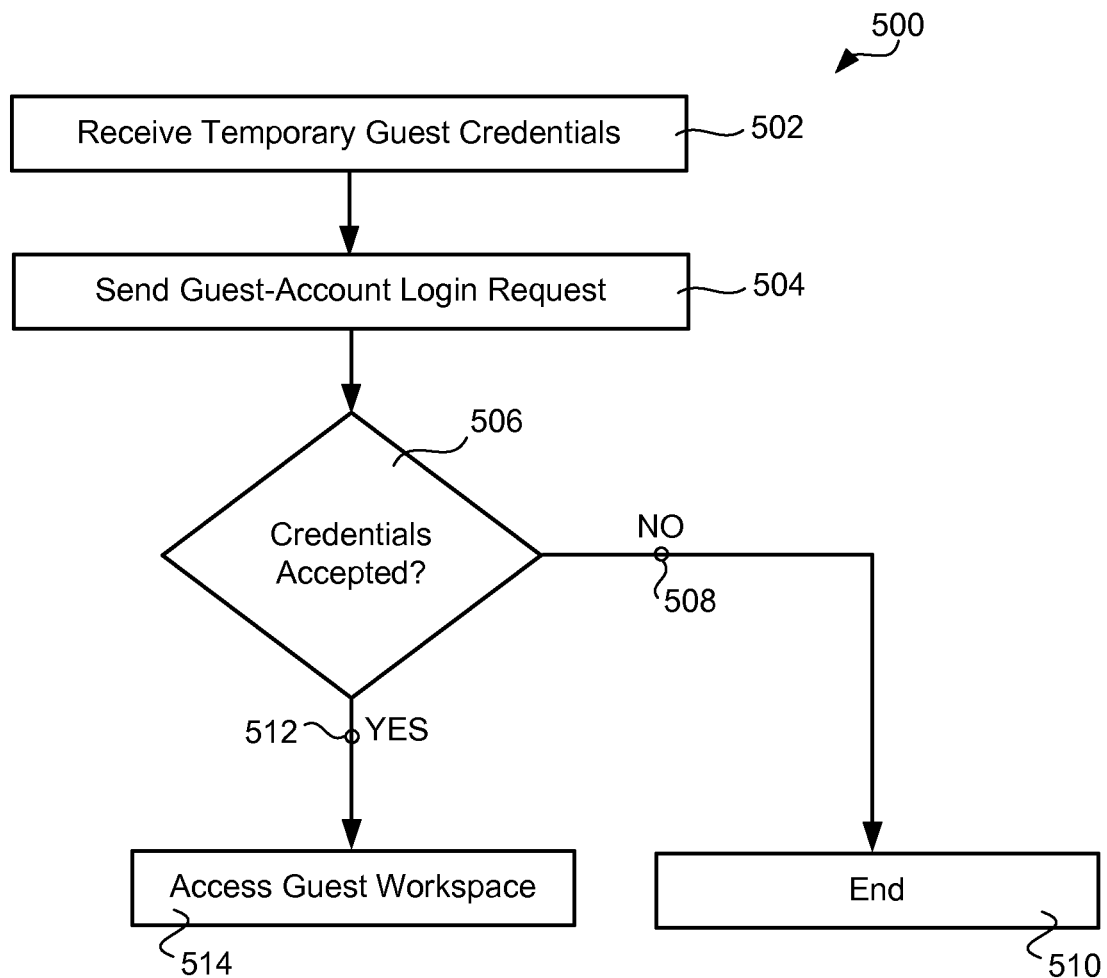
FIG. 5 is a flowchart depicting exemplary embodiments of the present invention comprising receiving temporary guest credentials, sending a login request to a resource server and accessing a guest workspace on said resource server when said login request is accepted.

Some embodiments of the present invention may comprise a method 500 for sharing digital assets and may be understood in relation to a flowchart shown in FIG. 5. Some embodiments of the present invention may comprise a non-transitory computer-readable medium encoded with a computer program code for implementing the method 500 shown in FIG. 5.

A client computing device may receive 502 temporary guest credentials, and a guest-account login request may be sent 504 to a resource server. The guest-account login request may comprise the temporary guest credentials. The client computing device may determine 506 whether, or not, the guest credentials were accepted at the resource server. If the guest credentials were not 508 accepted, the login process may terminate 510. If the guest credentials were 512 accepted, the client computing device may access 514 a guest workspace on the resource server.

In some embodiments of the present invention, a client computing device using guest credentials may upload files from the client computing device to a resource server.

In some embodiments of the present invention, a client computing device using guest credentials may download files from a resource server to the client computing device.

In some embodiments of the present invention, a client computing device may be a multi-function peripheral, or other printing device, and may access, using guest credentials, files in a guest workspace, on a resource server, for printing.

In some embodiments of the present invention, a client computing device may be a multi-function peripheral, a scanner, a digital interactive white-board or other image-acquisition device, and may scan, or otherwise acquire data, using guest credentials, directly to a guest workspace on a resource server.

Figure 6:
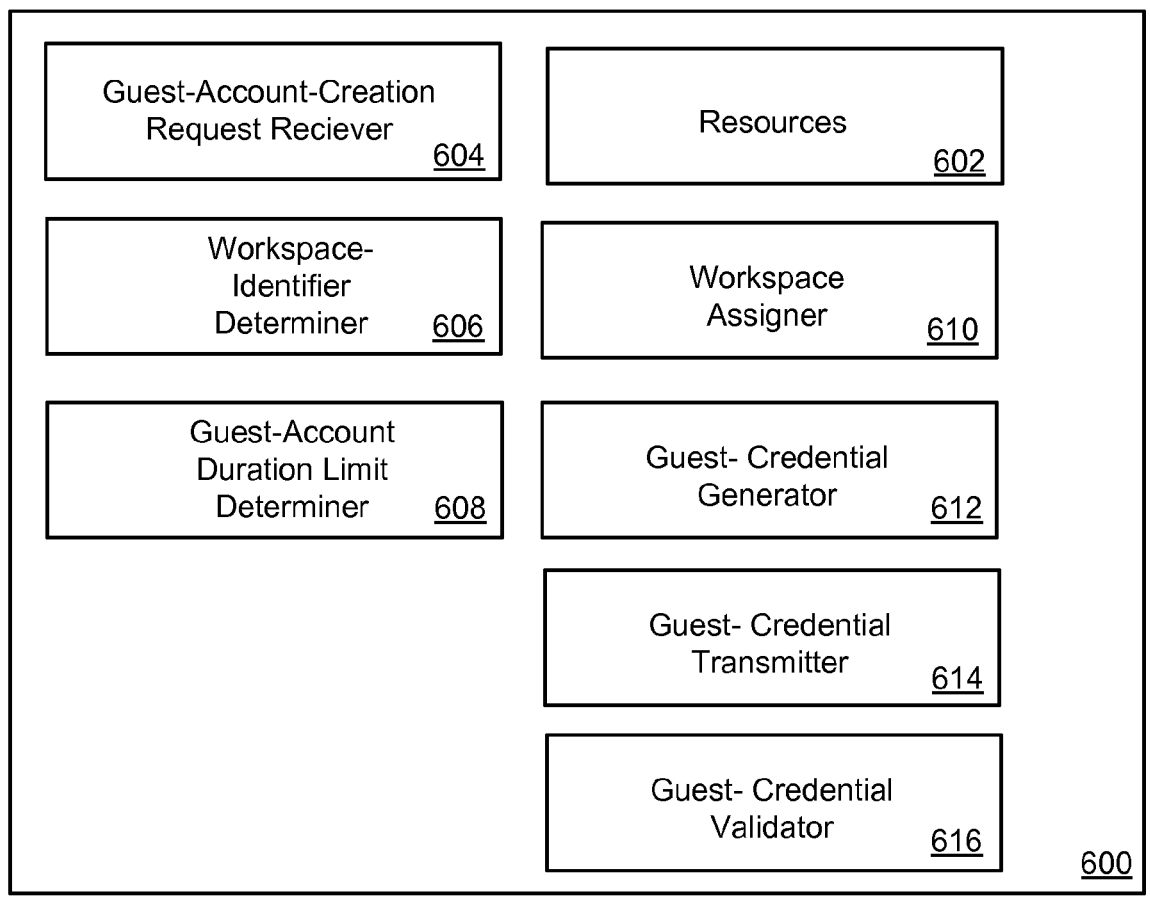
FIG. 6 is a picture illustrating exemplary embodiments of a resource server according to the present invention.

Some embodiments of the present invention may be described in relation to FIG. 6. Some embodiments of the present invention may comprise a resource server 600, for example, a cloud server or other server that allots resources. The resource server 600 may comprise a plurality of resources 602, for example, storage resources, functional resources and other resources. The resource server 600 may comprise a guest-account-creation request receiver 604 for receiving a request, associated with a subscriber, to create a guest account.

The resource server 600 may also comprise a workspace-identifier determiner 606. The workspace-identifier determiner 606 may determine a workspace identifier, wherein the workspace identifier identifies a workspace that a subscriber requests being made available to a non-subscriber. The workspace-identifier determiner 606 may extract the workspace identifier from the guest-account creation request, if the guest-account creation request comprises a workspace identifier. If it does not, the workspace-identifier determiner 606 may generate and send a request for a workspace identifier and may receive a response in conjunction with the request.

The resource server 600 may also comprise a guest-account duration limit determiner 608. The guest-account duration limit determiner 608 may determine a guest-account duration limit, wherein the guest-account duration limit may be a period of time for which guest credentials, also considered a guest credential, may be valid and for which the guest account may be accessed using the guest credentials. The guest-account duration limit may be indicated, for example, as an absolute date, a relative date, an interval of time, a number of accesses to the resource server, or any other duration indicator. The guest-account duration limit determiner 608 may extract the guest-account duration limit from the guest-account creation request, if the guest-account creation request comprises a guest-account duration limit. If it does not, the guest-account duration limit determiner 608 may generate and send a request for a guest-account duration limit and may receive a response in conjunction with the request.

The resource server 600 may also comprise a workspace assigner 610 for assigning a workspace associated with the workspace identifier. The workspace assigner 610 may create a workspace, if the workspace does not exist.

The resource server 600 may comprise a guest-credential generator 612 for generating guest credentials associated with the guest workspace.

The resource server 600 may comprise a guest-credential transmitter 614 for transmitting the guest credentials to the requesting client computing device. In some embodiments, the guest credentials may be emailed to an email account associated with the subscriber.

The resource server 600 may comprise a guest-credential validator 616 for validating a guest credential associated with a login request.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A non-transitory computer-readable medium encoded with a computer program code for implementing a method for sharing a digital asset, said method comprising:
receiving, at a resource server from a first client computing device associated with a subscriber user, a request for creation of a guest account;
receiving a workspace identifier, wherein said workspace identifier identifies a workspace which can be accessed by a non-subscriber user;
receiving a guest-account duration limit, wherein at least one of said workspace identifier and said guest-account duration limit is extracted from said request for creation of a guest account;
assigning a guest workspace associated with said workspace identifier;
generating a guest credential, wherein said guest-account duration limit indicates a period of time after which said guest credential expires;
associating said guest credential with said guest workspace; and
transmitting said guest credential to a location associated with said subscriber user.

2. A computer-readable medium according to claim 1, wherein, in said method, said resource server is a cloud server.

3. A computer-readable medium according to claim 1, wherein, in said method, said client computing device is a device selected from the group consisting of a smart phone, a laptop computer, a desktop computer, a printing device, a scanning device, an imaging device, a digital interactive white-board and a multi-function peripheral.

4. A computer-readable medium according to claim 1, wherein, in said method, said guest credential comprises a user name and a password.

5. A computer-readable medium according to claim 1, wherein, in said method, said guest-account duration limit is embedded in said guest credential.

6. A computer-readable medium according to claim 1, wherein, in said method, said workspace identifier is an identifier selected from the group consisting of a folder name and a directory name.

7. A computer-readable medium according to claim 1, said method further comprising creating said guest workspace.

8. A computer-readable medium according to claim 1, said method further comprising sending a request for said guest-account duration limit.

9. A non-transitory computer-readable medium encoded with a computer program code for implementing a method for sharing a digital asset, said method comprising:
receiving, at a resource server from a first client computing device associated with a subscriber user, a request for creation of a guest account;
receiving a workspace identifier, wherein said workspace identifier identifies a workspace which can be accessed by a non-subscriber user;
receiving a guest-account duration limit;
assigning a guest workspace associated with said workspace identifier;
generating a guest credential, wherein said guest-account duration limit indicates a period of time after which said guest credential expires and wherein said guest-account duration limit is embedded in said guest credential;
associating said guest credential with said guest workspace; and
transmitting said guest credential to a location associated with said subscriber user.

10. A computer-readable medium according to claim 1, wherein, in said method, said guest-account duration limit is indicated by a duration indicator selected from the group consisting of an absolute date, a relative date, a time interval and a number of accesses to said resource server using said guest credential.

11. A computer-readable medium according to claim 1, said method further comprising sending a request for said workspace identifier.

12. A computer-readable medium according to claim 9, said method further comprising extracting at least one of said workspace identifier and said guest-account duration limit from said request for creation of a guest account.

13. A computer-readable medium according to claim 1, said method further comprising transmitting an instruction with said guest credential.

14. A computer-readable medium according to claim 13, wherein, in said method, said instruction comprises a URL.

15. A non-transitory computer-readable medium encoded with a computer program code for implementing a method for sharing a digital asset, said method comprising:
receiving, at a resource server from a first client computing device associated with a subscriber user, a request for creation of a guest account;
receiving a workspace identifier, wherein said workspace identifier identifies a workspace which can be accessed by a non-subscriber user;
receiving a guest-account duration limit;
assigning a guest workspace associated with said workspace identifier;
generating a guest credential, wherein said guest-account duration limit indicates a period of time after which said guest credential expires;
associating said guest credential with said guest workspace;
transmitting said guest credential to a location associated with said subscriber user;
receiving a guest-account login request comprising said guest credential;
examining said guest credential to determining if said guest credential is valid;
when said guest credential is valid, allowing access to said guest workspace; and
when said guest credential is not valid, denying access to said guest workspace.

16. A computer-readable medium according to claim 15, said method further comprising denying access to a portion of said resource server when said portion is not said guest workspace.

17. A computer-readable medium according to claim 15, wherein, in said method, said examining said guest credential comprises determining if said guest-account duration limit has been exceeded.

18. A non-transitory computer-readable medium encoded with a computer program code for implementing a method for sharing a digital asset, said method comprising:
receiving a temporary guest credential associated with a guest workspace on a resource server, wherein said temporary guest credential comprises an embedded guest-account duration limit;
sending a guest-account login request to said resource server from a client computing device; and
accessing said guest workspace on said resource server.

19. A computer-readable medium according to claim 18, wherein, in said method, said sending a guest-account login request comprises sending said temporary guest credential.

20. A computer-readable medium according to claim 18, wherein, in said method, said resource server is a cloud server.

21. A computer-readable medium according to claim 18, wherein, in said method, said client computing device is a device selected from the group consisting of a smart phone, a laptop computer, a desktop computer, a printing device, a scanning device, an imaging device, a digital interactive white-board and a multi-function peripheral.

22. A computer-readable medium according to claim 18, wherein, in said method, said accessing a guest workspace on said resource server comprises downloading a file from said resource server.

23. A computer-readable medium according to claim 18, wherein, in said method, said accessing a guest workspace on said resource server comprises uploading a file to said resource server.

24. A computer-readable medium according to claim 18, wherein, in said method, said accessing a guest workspace on said resource server comprises scanning a document directly to said resource server from said client computing device.

25. A computer-readable medium according to claim 18, wherein, in said method, said accessing a guest workspace on said resource server comprising printing a first file from said guest workspace directly on said client computing device.

\* \* \* \* \*